C. E. PATRIC.
SPRING HOE FOR GRAIN DRILLS.
No. 184,018. Patented Nov. 7, 1876.
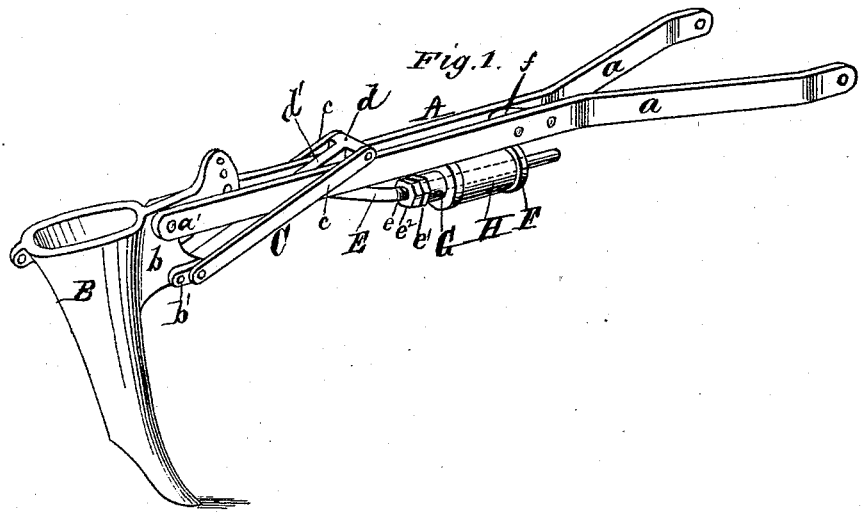
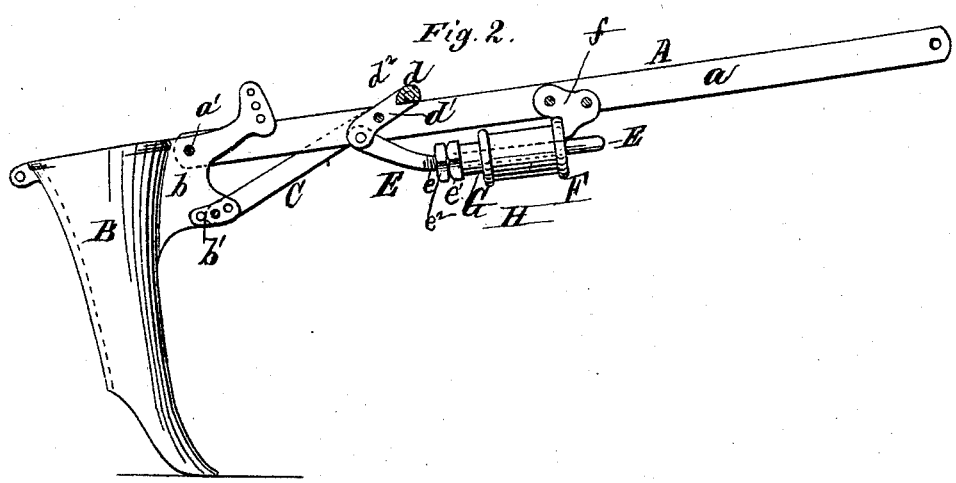
Witnesses:
Alex Mahon
John E. Center
Inventor:
Charles E. Patric
by A. M. Smith
Attorney.

UNITED STATES PATENT OFFICE.

CHARLES E. PATRIC, OF SPRINGFIELD, OHIO.

IMPROVEMENT IN SPRING-HOES FOR GRAIN-DRILLS.

Specification forming part of Letters Patent No. 184,018, dated November 7, 1876; application filed March 11, 1876.

*To all whom it may concern:*

Be it known that I, CHARLES E. PATRIC, of Springfield, county of Clarke, State of Ohio, have invented certain new and useful Improvements in Spring-Hoes for Grain-Drills or Seeding-Machines, of which the following is a full, clear, and exact description, reference being had to the accompanying drawings, making a part of this specification, in which—

Figure 1 is a perspective view of one of the drag-bars of a grain-drill with the tooth or hoe attached, showing the spring-connection between the two; and Fig. 2 is a side elevation of the same, with one of the straps or plates of the drag-bar removed, showing the arrangement of the locking device relative to the spring and hoe.

Similar letters of reference denote corresponding parts in both figures.

My invention relates to a novel arrangement of spring for holding the drill-tooth or hoe to its work, while at the same time adapting it to yield to obstructions which would otherwise be liable to break or injure it.

In the accompanying drawings, A represents the drag-bar, made, by preference, of two straps or plates, $a\,a$, lying parallel with each other for the greater part of their length, but diverging at their forward ends to give a bracing form laterally to the connection with the main frame. The hoe B is pivoted at $a'$ to rear end of this bar, the pivot passing through the straps $a\,a$, and an intermediate flange, $b$, formed on the forward face of the hoe or teeth. The flange $b$ extends below the drag-bar, and is provided with a series of perforations, $b'$, arranged in the arc of a circle, of which the pivot $a'$ is the center, and with any one of which the rear end of a link-brace, C, may be connected, according to the angle or pitch it is desired to give to the hoe. The link-brace C, like the drag-bar, is composed of two parts or straps, which embrace the flange $b$ between them and extend forward and up outside of the bars $a\,a$, and have their forward ends pivoted to the upper end of a locking-link, $d$, made in T shape, the shank or upright portion $d^1$ of said link extending down between the bars $a\,a$, and being pivoted thereto, as shown at $d^2$. The shank $d^1$ extends beyond the pivot $d^2$, forming an arm or lever, to the lower end of which a rod or piston, E, is attached, said rod extending forward and passing through a guide-bracket attached to the drag-bar. This guide-bracket consists of a vertical transverse disk, F, perforated to receive and guide the reciprocations of the piston-rod E, said disk being provided with a flange, $f$, which, by preference, extends up between the bars $a\,a$, serving, in connection with the flange $b$, to space said bars, and bolts or rivets passing through the bars $a\,a$ and flange $f$ secure said parts rigidly together. The rod E at $e$ is slightly enlarged, and is provided with a nut, $e^1$, and jam-nut $e^2$, and in front of said nut is placed a collar, G, provided on its forward end with a flange or disk corresponding to the disk F, and surrounding the piston-rod E, and filling the space between the disks F G, is a spring, H, the tension of which serves to force the rod E backward, and said rod, acting upon the lower arm of the locking-link $d$, vibrates said link until the cross-head at its upper end rests on the bars $a\,a$, in which position the shank $d^1$ of said link lies nearly parallel with the link-brace C, as shown in the drawings, bringing the joint between the two almost to a dead-center. The cross-head of the link $d$ prevents the joint between the links C and $d$ from coming to a perfect dead-center, but allows it to approach so nearly that a slight pressure from the spring H at this point serves to hold the links in the described relation to each other, and thereby to hold the hoes in working position, except in the event of their meeting an obstruction which would be liable to injure or break them, in which case the tension of the spring is overcome, and the backward vibration of the link $d$ permits the hoes to yield backward and upward to pass over the obstruction in a manner well understood. As the hoe vibrates backward the leverage of the link $d$ upon the spring H increases, facilitating the yielding of the hoe until the link $d$ passes a vertical position, and the lower end of said link, which is connected to the rod E, begins an upward movement, when the compressing action upon the spring is less rapid, and consequently the tension of said spring is not increased in proportion to the height of the obstruction to be passed over, while it is at all times sufficient to insure the return of the hoe to its working position after the obstruction is passed. By this arrangement of the spring and connecting devices the hoes are adapted to pass with equal facility over large and small obstructions. The tension of the spring, and the degree of resistance required before the hoe will yield to an obstruction, are readily regulated by adjusting the nuts $e^1$ $e^2$ and collar G. A gum or rubber spring is shown; but a spiral or other form of metal spring may be used, if preferred.

Having now described my invention, what I claim as new, and desire to secure by Letters Patent, is—

1. The pivoted hoe or drill-tooth, connected with the drag-bar by means of the links C and $d$, in combination with the piston-rod E and spring H, arranged and operating as described.

2. The piston-rod E, connected with the locking-link $d$ and working with the guide-bracket F, in combination with the spring H and adjusting-nut $e^1$, arranged and operating as described.

3. The flange $b$, provided with the series of perforations $b'$, arranged in the arc of a circle, as described, in combination with the adjustable link-brace C, locking-link $d$, rod E, and spring H, all arranged and operating as described.

CHARLES E. PATRIC.

Witnesses:
A. P. LINN COCHRAN,
ROBT. C. RODGERS.